United States Patent [19]
Iwagaya et al.

[11] Patent Number: 5,260,630
[45] Date of Patent: Nov. 9, 1993

[54] NUMERICAL CONTROL APPARATUS

[75] Inventors: Takashi Iwagaya, Sizuoka; Takashi Kurokawa, Yamanashi, both of Japan

[73] Assignee: Fanuc Ltd., Minamitsuru, Japan

[21] Appl. No.: 449,922

[22] PCT Filed: Apr. 4, 1989

[86] PCT No.: PCT/JP89/00356
§ 371 Date: Dec. 15, 1989
§ 102(e) Date: Dec. 15, 1989

[87] PCT Pub. No.: WO89/10587
PCT Pub. Date: Nov. 2, 1989

[30] Foreign Application Priority Data
Apr. 27, 1988 [JP] Japan .................. 63-105304

[51] Int. Cl.⁵ .............................. G05B 19/18
[52] U.S. Cl. .......................... 318/569; 318/625
[58] Field of Search ................... 318/569, 625; 364/474.11, 474.23

[56] References Cited
U.S. PATENT DOCUMENTS
4,692,872  9/1987  Kiya .................. 318/569 X
4,862,380  8/1989  Kawamura et al. ...... 318/625 X FOREIGN PATENT DOCUMENTS
293307 12/1987 Japan .

Primary Examiner—William M. Shoop, Jr.
Assistant Examiner—Helen Kim
Attorney, Agent, or Firm—Staas & Halsey

[57] ABSTRACT

A numerical control apparatus for independently controlling the rotational velocity of a plurality of spindles. One or more spindles and one spindle rotational velocity are designated by NC data outputted by an NC data generating unit (1), the data in memories (3a-3n) corresponding to spindles designated by switching unit (2) is updated by the designated spindle rotational velocity, and motors (6a-6n) of corresponding spindles are controlled to rotate at the spindle rotational velocities stored in the memories (3a-3n).

7 Claims, 2 Drawing Sheets

FIG. I

NUMERICAL CONTROL APPARATUS

BACKGROUND OF THE INVENTION a. Field of the Invention

This invention relates to a numerical control apparatus and, more particularly, to a numerical control apparatus for controlling the rotational velocity of a plurality of spindles independently or simultaneously.

b. Description of the Related Art

Some machine tools such as lathes are equipped with a plurality of spindles. For example, a lathe for backface machining has two spindles in order to rotate a workpiece. Back-face machining is performed by setting a workpiece on one spindle automatically when machining using the other spindle is completed. Besides machining such as turning, lathes can apply other types of machining, such as boring and grooving. In such case, the tools themselves must be rotated, there are two tool rests, and the number of spindles is three, four or more.

In order to control the rotational velocities of a plurality of spindles, the practice in the prior art is to (i) provide a plurality of rpm command output units and a plurality of units for converting rpm commands into voltages and delivering these voltages to a spindle control amplifier, or (ii) change over one rpm command so that the command may be used to control any one of a plurality of spindles. However, these former methods require provision of a plurality of spindle control systems and therefore result in a large and costly apparatus. Such methods are not suited for the control of a number of spindles.

Further, with the latter method, an rpm command is issued for only one spindle at all times. Consequently, even if spindles are to be commanded to rotate at the same rpm, it is required that the command be changed over a plurality of times. As a result, operability is poor when controlling a number of spindles.

Accordingly, an object of the present invention is to provide a numerical control apparatus in which control of the rotation of a plurality of spindles is performed in efficient fashion and at high speed, and in which it is possible to readily deal with a change in the number of spindles.

SUMMARY OF THE INVENTION

In order to solve the foregoing problems, the numerical control apparatus of the present invention comprises an NC data generating unit for generating NC data for the purpose of designating spindle rpm, switching unit, and memory unit provided correspondingly for each spindle for storing spindle rotational velocity, wherein one or more spindles and one spindle rotational velocity are designated by NC data, the designated spindle rotational velocity is stored via the switching unit in the memory unit corresponding to the designated spindles, and the corresponding spindles are controlled to rotate at the spindle rotational velocity stored in each memory unit.

DESCRIPTION OF THE PREFERRED EMBODIMENT

Figure 1:
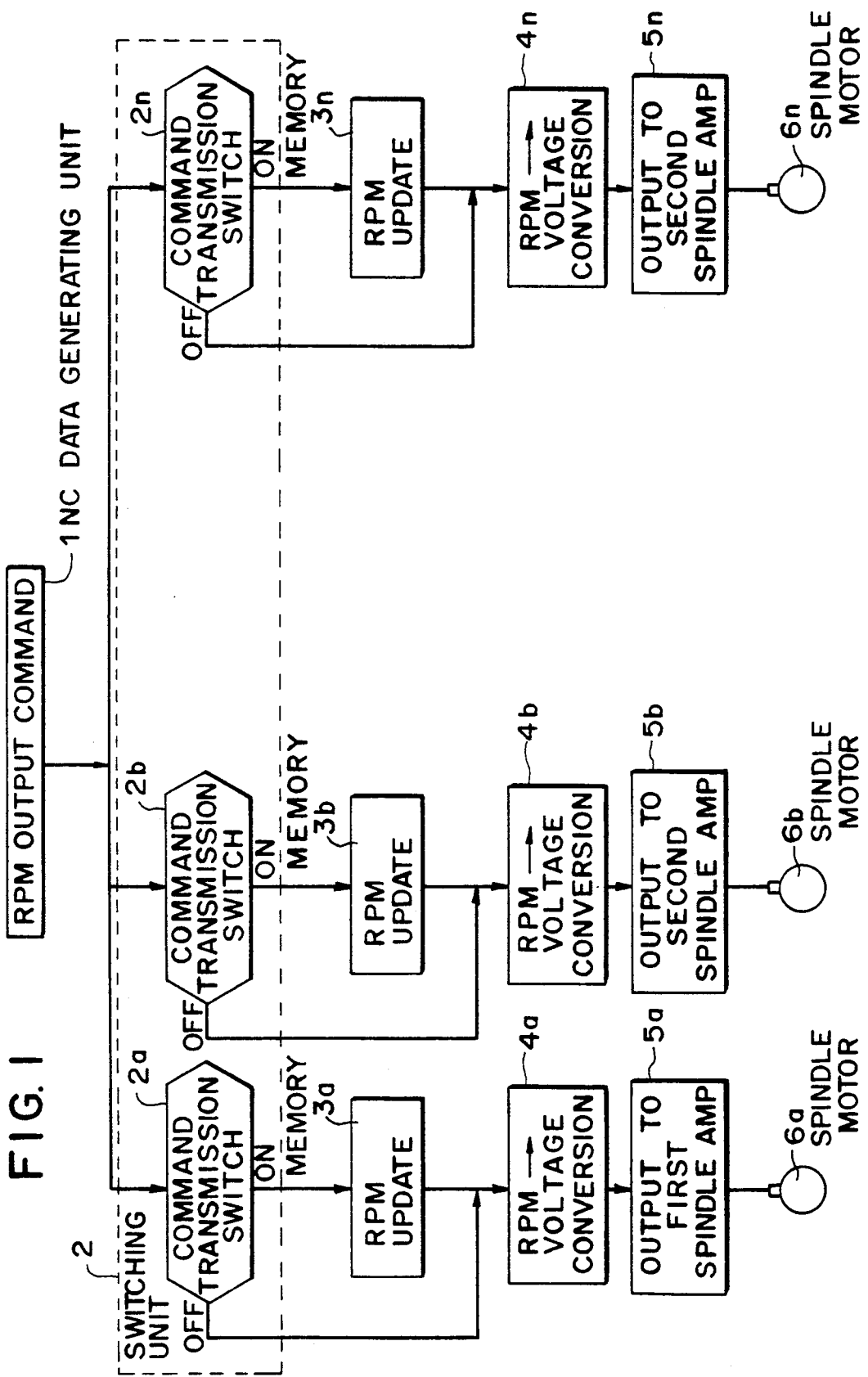
FIG. 1 is a functional block diagram of a numerical control apparatus according to the present invention.

FIG. 1 is a functional block diagram of a numerical control apparatus according to the present invention, in which numeral 1 denotes an NC data generating unit, 2 denotes a switching unit, 2a through 2n denote command transmission switches which are provided for each of the corresponding spindles, 3a through 3n denote memory units provided for each of the corresponding spindles, 4a through 4n denote converters provided for each of the corresponding memory units for converting rpm's into voltage data, 5a through 5n denote spindle drive amplifiers, and 6a through 6n denote spindle motors.

When the NC data generating unit 1 issues a command for one or more spindles and one spindle rotational velocity, the command transmission switches 2a through 2n are turned on, so that the contents in the memories 3a through 3n of the spindles commanded via the switches are updated by the commanded spindle rotational velocity. As a result, the rotation of the corresponding spindle motors 6a through 6n is controlled in accordance with the spindle rotational velocity stored in the memories 3a through 3n.

When one or more spindles and rotation-stop are commanded by the NC data generating unit 1, the command transmission switches 2a through 2n corresponding to the commanded spindles are turned off. Accordingly, the drive paths of these spindles are opened or the contents of the corresponding memories are cleared, a result of which is that rotation of the spindles is stopped.

Figure 2:
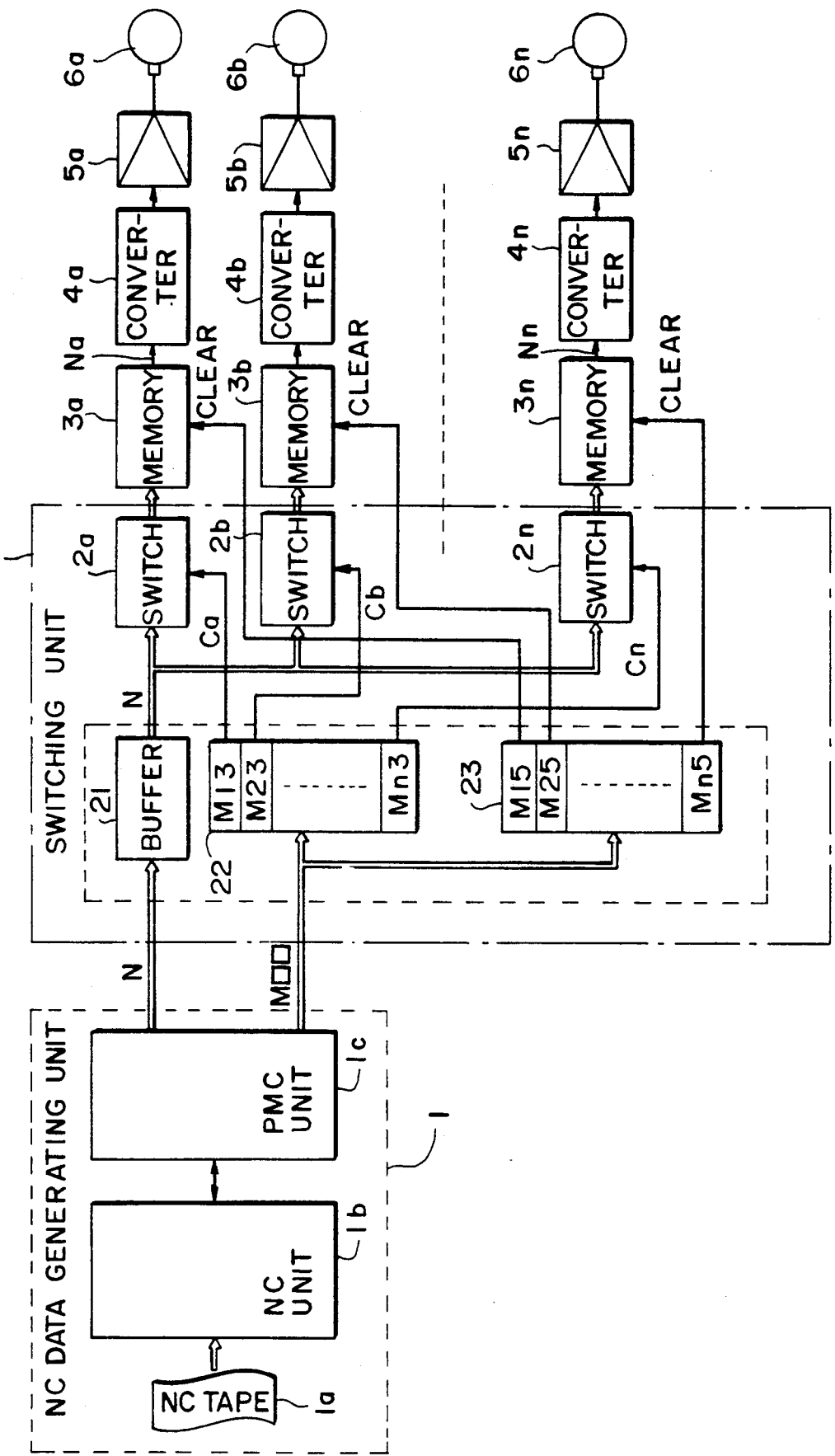
FIG. 2 is a block diagram of a numerical control apparatus according to the present invention.

FIG. 2 is a block diagram of the numerical control apparatus according to the invention. Numeral 1 denotes the NC data generating unit, which has an NC data tape 1a on which NC data are stored, an NC unit 1b which performs numerical control processing based on the NC data, and a programmable machine controller (PMC) 1c for controlling exchange of data between the NC unit 1b and the machine side based on a sequence program. Forward rotation of first, second, . . . , n-th spindles is commanded respectively by the following auxiliary function instructions:

M13, M23, . . . , Mn3 and reverse rotation of the first, second, . . . , n-th spindles is commanded respectively by the following auxiliary function instructions:

M14, M24, . . . , Mn4

Stopping rotation of the first, second, . . . , n-th spindles is commanded respectively by the following auxiliary function instructions:

M15, M25, . . . , Mn5

Accordingly, the NC data for forwardly rotating one spindle, e.g., the first spindle, at a predetermined rpm is

M13 S}. . };     (1)

(where S is an address word for commanding spindle rpm, and }. . } is a five-digit code indicating the spindle rpm). NC data for forwardly rotating a plurality of spindles, e.g., the first through third spindles, at a predetermined rpm is as follows:

M13 M23 M33 S}. . }; (2)

The same holds in the case of reverse rotation and rotation-stop.

Numeral 2 denotes switching unit which includes a buffer 21 for storing spindle rpm N outputted by the NC data generating unti 1, a buffer 22 for storing forward-rotation commands M13-Mn3 of respective axes, a buffer 23 for storing rotation-stop commands M15-Mn5 of respective axes, and command transmission (writing) switches 2a-2n provided for corresponding ones of the spindles. Buffers for reverse rotation are not shown. Forward-rotation and stop-commands of the respective axes are stored by making the corresponding bits in the buffers 22, 23 the logic value "1".

Numerals 3a-3n denote the memory units provided for corresponding ones of the spindles, 4a-4n designate converters provided for corresponding ones of the memory units for converting rpm into voltage data, 5a-5n represent spindle drive amplifiers, and 6a-6n denote spindle motors.

When, for example, a spindle rotation command of format (1) or (2) is read from the NC tape 1a by the NC unit 1b, the latter transfers the spindle rpm N (={}) and the forward-rotation commands of the respective axes to the switching unit 2 via the PMC 1c.

The switching unit 2 stores the spindle rpm N in the buffer 21 and outputs it to the switches 2a-2n. Among the bits corresponding to forward-rotation commands (M13-Mn3) along respective axes in the buffer 22, the switching unit 2 makes "1" those bits of the spindles for which forward rotation has been commanded. Bits of spindles not commanded for forward rotation are "0".

The "1" and "0" values of each bit of the buffer 22 are inputted as rpm transmission control signals $C_a$-$C_n$ to the corresponding switches 2a-2n. The switches receiving "0" do not transmit the commanded spindle rpm N from the buffer 21, whereas those receiving "1" do transmit the commanded spindle rpm N from the buffer 21. As a result, only the switches corresponding to the spindles provided with the spindle rotation command by the NC data transmit the commanded spindle rpm to the corresponding memory unit to update the contents thereof. Further, contents of the memory unit corresponding to the "0" switches do not change, these memory units continue storing the former spindle rpm.

Thereafter, the rpm's stored in the memory unit 3a-3n are converted into voltage data by the corresponding converters 4a-4n, after which these data enter the amplifiers 5a-5n in the form of analog voltages. Here the voltages are amplified to rotate the spindle motors 6a-6n at the commanded rotational velocity. Accordingly, all spindles commanded to rotate forwardly or reversely by the NC data start rotating simultaneously at the newly commanded spindle rpm, and those spindles not issued commands continue rotating at the velocity (inclusive of zero or the stopped state) previously commanded. In the foregoing, spindle rpm N is stored in the memory unit 3a-3n. However, an arrangement can be adopted in which these memory units are disposed in back of the converters to store the voltage data.

In a case where rotation of the spindles is halted by the spindle rotation-stop commands M15-Mn5, NC data of the following form are entered from the NC tape 1a:

M15; stop command for one spindle

M15M25M35; stop command for a plurality of spindles As a result, among the bits of buffer 23 corresponding to the spindle-stop commands M15-Mn5 of respective axes, "1" is stored in those bits of the spindles for which stop is commanded. Bits for spindles not provided with the stop command are "0".

The "1" and "0" of each bit of the buffer 23 are input to clear terminals of the corresponding memory units 3a-3n, so that the contents (rpm) of the memory units corresponding to the spindles whose rotation is commanded to stop is cleared to zero. As a result the, spindles commanded to stop rotating come to a halt.

It is permissible to adopt an arrangement in which the switching units 2 is constituted by a microcomputer. In a case when spindle rpm N is commanded in such an arrangement, the spindle rpm's N stored in the memory units 3a-3n corresponding to the spindles issued commands would be updated by the commanded spindle rpm V (the rpm's in the other memory units are not updated). In a case where rotation-stop is commanded, only the contents of the memory units corresponding to the spindles issued commands would be cleared to zero.

In accordance with the present invention as set forth above, one or more spindles and one spindle rotational velocity are designated by NC data, only the memory units corresponding to the designated spindles are updated by the designated spindle rotational velocity via the switching units, and the spindles are controlled to rotate at the spindle rotational velocity stored in each memory unit. As a result, the rpm's of the spindles can be easily changed changed both, at high speed and at the same time. In addition, it is possible to readily deal with a change in the number of spindles.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

What is claimed is:

1. A numerical control apparatus including at least an NC data generating means for generating NC data for the purpose of designating spindle rpm for a plurality of spindles, switching means, and memory means provided correspondingly for each spindle for storing spindle rotational velocity, characterized in that:

at least one of the spindles and one spindle rotational velocity are designated by the NC data, the spindle rotational velocity designated is stored via the switching means in the memory means corresponding to the at least one of the spindles designated, and each of the spindles are controlled to rotate at the spindle rotational velocity stored in the memory means corresponding thereto.

2. A numerical control apparatus according to claim 1, characterized in that the NC data includes a stop command generated for clearing the memory means corresponding to the at least one of the spindles designated, and contents of the memory means corresponding to the at least one of the spindles designated are cleared via the switching means based on the stop command.

3. A numerical control apparatus according to claim 2, characterized in that the stop command for clearing the memory means includes a spindle-stop command for specifying at least one of the spindles and a spindle-stop command.

4. A numerical control apparatus for independently controlling a rotational velocity of a plurality of spindles, comprising:

data generating means for issuing a rotational velocity command, the rotational velocity command includes a velocity value and designates at least one of the spindles;

storage means for receiving the rotational velocity command from said data generating means and for updating a stored velocity value with the velocity value for the spindles corresponding to each of the spindles designated by the rotational velocity command; and spindle motors for controlling the rotational velocity of the spindles based on the stored velocity value for each of the spindles, wherein said storage means comprises first buffer means for storing the velocity value,
    second buffer means, having an area corresponding to each of said spindle motors, for storing a logic value in each of the areas corresponding to the spindles designated, memory means for storing the stored velocity value corresponding to each of said spindle motors, and switch means, operatively connected to said memory means and said first and second buffer means, for sending the velocity value to said memory means to update the stored velocity value for said spindle motors corresponding to the spindles designated.

5. A numerical control apparatus according to claim 4, wherein the rotational velocity command includes one of a forward rotation command, reverse rotation command and a stop command, and wherein said memory means includes a clear terminal for clearing the stored velocity value corresponding to the spindles designated when the rotational velocity command is the stop command.

6. A numerical control apparatus according to claim 4, wherein the stored velocity value is simultaneously updated for all the spindles designated.

7. A numerical control apparatus according to claim 6, wherein the rotational velocity command designates a plurality of spindles to receive the velocity value.

* * * * *

UNITED STATES PATENT AND TRADEMARK OFFICE
CERTIFICATE OF CORRECTION

PATENT NO. : 5,260,630
DATED     : November 9, 1993
INVENTOR(S) : Takashi Iwagaya et al.

It is certified that error appears in the above-identified patent and that said Letters Patent is hereby corrected as shown below:

Col. 1, line 44, before "efficient" insert --in--.

Col. 3, line 8, "unti" should be --unit--; and line 36, "inputted" should be --input--.

Col. 4, line 11, after "result" insert --,--, and after "the" delete ",";

line 19, "V" should be --N--; and line 31, after "changed" insert --,--, and after "both" delete ",".

Signed and Sealed this

Fourteenth Day of June, 1994

Attest:

BRUCE LEHMAN

Attesting Officer   Commissioner of Patents and Trademarks